United States Patent
Ul

(10) Patent No.: US 12,454,467 B2
(45) Date of Patent: Oct. 28, 2025

(54) NICKEL ZINC COPPER FERRITE FOR VUHF ANTENNA APPLICATION

(71) Applicant: Exxelia, Paris (FR)

(72) Inventor: Rémy Ul, Pessac (FR)

(73) Assignee: EXXELIA, Paris (FR)

( * ) Notice: Subject to any disclaimer, the term of this patent is extended or adjusted under 35 U.S.C. 154(b) by 816 days.

(21) Appl. No.: 17/660,370

(22) Filed: Apr. 22, 2022

(65) Prior Publication Data

US 2022/0348479 A1    Nov. 3, 2022

(30) Foreign Application Priority Data

Apr. 28, 2021   (FR) ..................... 21 04412

(51) Int. Cl.
| | | |
|---|---|---|
| C01G 53/40 | (2025.01) | |
| C04B 35/26 | (2006.01) | |
| H01F 1/34 | (2006.01) | |
| H01Q 1/36 | (2006.01) | |
| H01Q 5/20 | (2015.01) | |
| H01Q 9/04 | (2006.01) | |

(52) U.S. Cl.
CPC ............ *C01G 53/40* (2013.01); *C04B 35/265* (2013.01); *H01F 1/344* (2013.01); *H01Q 1/36* (2013.01); *H01Q 5/20* (2015.01); *H01Q 9/0407* (2013.01); *C01P 2002/32* (2013.01); *C01P 2002/50* (2013.01); *C01P 2006/42* (2013.01); *C04B 2235/3272* (2013.01); *C04B 2235/3275* (2013.01); *C04B 2235/3277* (2013.01); *C04B 2235/3279* (2013.01); *C04B 2235/3281* (2013.01); *C04B 2235/3284* (2013.01)

(58) Field of Classification Search
CPC ........ H01F 1/344; C01G 49/009; H01Q 1/36; H01Q 9/0407; H01Q 5/20; C01P 2002/32; C01P 2002/50; C01P 2006/42; C04B 35/265; C04B 2235/3275; C04B 2235/3279; C04B 2235/3281; C04B 2235/3284; C04B 2235/3272; C04B 2235/3277

See application file for complete search history.

(56) References Cited

U.S. PATENT DOCUMENTS

| 2,995,517 A | 8/1961 | O'Hara | |
|---|---|---|---|
| 2016/0203908 A1* | 7/2016 | Mazaleyrat | ............ H01F 41/02 29/606 |

FOREIGN PATENT DOCUMENTS

EP    0800183 A1    10/1997

OTHER PUBLICATIONS

French Search Report issued for French Patent Application No. 2104412, dated Nov. 29, 2021 in 3 pages.

Thakur et al., "Smart magnetodielectric nano-materials for the very high frequency applications"; Journal of Alloys and Compounds, Elesevier Sequoia, Lausanne, CH, vol. 509, No. 17, pp. 5315-5319, Feb. 2011.

Li et al., "Tunable ferromagnetic resonance linewidth of cobalt-substituted NiCuZn ferrites"; Journal of Alloys and Compounds, vol. 752, pp. 395-401, Jul. 2018.

Mukesh et al., "Complex permittivity and permeability of Co-substituted NiCuZn ferrite at rf and microwave frequencies"; Journal of Electroceramics, Kluwer Academic Publishers, Bo, vol. 16, No. 4, pp. 331-335, Jul. 2006.

Soka et al., "Microstructural and Magnetic Characteristics of Divalent Zn, Cu and Co-Doped Ni Ferrites"; Acta Physica Polonica. A, vol. 131, No. 4, pp. 609-692, Jun. 13, 2017.

* cited by examiner

*Primary Examiner* — C Melissa Koslow
(74) *Attorney, Agent, or Firm* — NIXON & VANDERHYE

(57) ABSTRACT

A composition and a solid material is especially suitable for the manufacture of an antenna adapted to operate in the very high frequency and ultra high frequency or V/UHF band. The composition has the formula $Ni_aZn_bCu_cCo_dFe_{2-\delta}O_4$, in which $2(a+b+c+d)+3(2-\delta)=8$, $0.05<b<0.5$, e.g. $0.1<b<0.5$, e.g. $0.1<b<0.4$, e.g. $0.15<b<0.35$, $0.10<c<0.25$, preferably $0.15<c<0.25$, alternatively c is 0.20, $0.04<d<0.25$, preferably $0.06<d<0.25$, and more preferably $0.07<d<0.25$, and $\delta<0.05$.

14 Claims, 8 Drawing Sheets

NICKEL ZINC COPPER FERRITE FOR VUHF ANTENNA APPLICATION

CROSS-REFERENCE TO RELATED APPLICATIONS

This application claims priority to French Patent Application No. 21 04412 filed on Apr. 28, 2021, the disclosure of which including the specification, the drawings, and the claims is hereby incorporated by reference in its entirety

FIELD OF THE INVENTION

The present invention relates to a composition and a solid material, especially suitable for the manufacture of an antenna adapted to operate in the very high frequency (VHF) band between 30 MHz and 300 MHz, and ultra high frequency (UHF) band between 300 MHz and 3 GHz, or V/UHF, as well as to a method of manufacture and their uses.

BACKGROUND OF THE INVENTION

The miniature nature of an antenna is a major issue, especially for antennas operating below GHz. Indeed, the size of an antenna is directly proportional to the wavelength of the transmitted/received signal, which is on the order of a metre for VHF/UHF frequencies (VHF: 30 MHz to 300 MHz; UHF: 300 MHz to 3000 MHz). Today, one of the strategies generally used to reduce the geometric dimensions of an antenna is to use a dielectric material with a high dielectric constant (E'). However, the use of such materials leads to a decrease in antenna performance (gain, bandwidth).

This limitation can be overcome by using magneto-dielectric materials such as ferrites. Indeed, the use of materials with high permeability ($\epsilon'$) would make it possible to reduce the size of the antennas while maximising their efficiency. Indeed, although $\epsilon'$ has a positive impact on the dielectric losses and on the amount of stored energy, it has been proven that: (i) $\epsilon'$ has a negative impact on the bandwidth as well as on the antenna efficiency and (ii) $\mu'$ has the opposite effect and therefore has a positive impact on both parameters. Moreover, if the antenna is kept iso-dimensional, such a material would increase its performance (M. A. C Niamien, S. Collardey, A. Sharaiha, K. Mahdjoubi, "Compact Expressions for Efficiency and Bandwidth of Patch Antennas Over Lossy Magneto-Dielectric Materials," *IEEE antennas and wireless propaga. letters*, 10 (2011) 63-66).

It has long been generally known that the addition of low concentrations of cobalt to ferrites, and in particular to nickel-zinc ferrites, can have a positive effect on the magnetic losses of the compound. An example is the study by Lau and Stuijts (J. G. M Lau and A. L. Stuijts, Chemical Composition and High-Frequency Properties of Ni—Zn—Co Ferrites, *Philips Res. Repts*, 21 (1966) 104-112) which presents mechanisms of cobalt ion behaviour in the crystal structure of $(Ni_{0.8}Zn_{0.2})_{0.97-x}Co_{0.003}Fe_2O_{4+y}$. There are a large number of studies focusing on cobalt-substituted nickel-zinc ferrites. However, the compositions in question do not contain copper and have performances in terms of magnetic losses at high frequency (Frequency F>100 MHz) that are much lower than those set out in the present invention. Some of the compositions manage to exhibit stable behaviour in terms of magnetic permeability. However, they have the problem that ferrimagnetic resonance occurs at too low a frequency and causes an increase in magnetic losses from about 10 MHz.

There are some laboratory-scale nickel-zinc based ferrite materials that exhibit similar performance to the invention. For example, the team of Mathur et al. published in 2010 a ferrite composition allowing high frequency use (P. Mathur, A. Thakur, J. H. Lee, M. Singh, Sustained electromagnetic properties of Ni—Zn—Co nanoferrites for the high-frequency applications, *Materials Letters*, 64 (2010) 2738-2741). Indeed, the material developed has low magnetic losses (loss tangent of about 0.05) over a frequency range from 10 to 200 MHz and a magnetic permeability $\mu'$ of about 9. The composition of the material presented is as follows: $Ni_{0.49}Zn_{0.49}Co_{0.02}Fe_2O_4$. As the cobalt content was low (0.02 mol), the authors used another method to push the resonance beyond 200 MHz. They used a co-precipitation method to synthesise the compound into particles of the order of about 50 nm and sintered their material at lower temperatures to avoid excessive crystal growth. The material thus has a fine microstructure that allows the motion kinetics of the magnetic domain walls to be changed to repel resonance. The co-precipitation synthesis method is very different from the traditional synthesis method. It is also costly and complicated to implement from an industrial point of view.

The team of Saini et al. (A. Saini, A. Thakur, P. Thakur, Matching permeability and permittivity of $Ni_{0.5}Zn_{0.3}Co_{0.2}In_{0.1}Fe_{1.9}O_4$ ferrite for substrate of large bandwidth miniaturized antenna, *J Mater Sci: Mater Electron*, 27 (2016) 2816-2823) shows the interest of the composition $Ni_{0.5}Zn_{0.3}Co_{0.2}In_{0.1}Fe_{1.9}O_4$ for the miniaturization of antennas in UHF with again in bandwidth if compared to an antenna loaded with a simple dielectric material. This material is synthesised by co-precipitation and has a high cobalt content (0.2 mol). It has a magnetic permeability of about 5-6 and low magnetic losses up to at least 500-600 MHz.

Finally, we can also mention the work carried out in the Lab-STICC laboratory in Brest (France), which focuses on the manufacture of a magneto-dielectric material by co-precipitation that can meet antenna requirements in the V/UHF frequency bands. Several as results have been published which demonstrate the interest of using the co-precipitation method on compounds such as $Ni_{0.5}Zn_{0.3}Co_{0.2}Fe_{1.98}O_{4-\delta}$ to achieve low magnetic losses at high frequencies while maintaining a relatively high permeability.

Nickel-zinc-copper ferrites are widely used for inductors. Manufacturers take advantage of the low sintering temperature of this compound (<1000° C.), which is afforded by the large degree of copper (usually between 0.2 and 0.25 mol), to co-sinter the ferrite with the electrodes or the winding directly. It has been reported that when copper is added to a compound such as $Ni_{0.8-x}Zn_{0.2}Cu_xFe_2O_4$, an optimum exists for a copper addition of 0.2 mol (J. J. Shrotri, S. D. Kulkami, C. E. Deshpande, A. Mitra, S. R. Sainkar, P. S. Anil Kumar, S. K. Date, Effect of Cu substitution on the magnetic and electrical properties of Ni—Zn ferrite synthesised by soft chemical method, *Materials Chemistry and Physics*, 59 (1999) 1-5). For values that are too high (x≥0.3 mol), the copper forms a second $CuO/CuFeO_4$ phase and the properties of the material degrade.

Many studies show Ni—Zn—Cu ferrites with interesting high-frequency behaviour. However, the frequencies considered are often too low for the applications covered by the invention. This type of material generally has a ferrimagnetic resonance between 1 and 100 MHz. In addition, the occurrence of resonance is accompanied by an increase in magnetic losses (represented by the value μ" or tan $\delta_\mu$) making the material unusable as an antenna material over frequency bands extending beyond this resonance.

SUMMARY OF THE INVENTION

The present invention aims to solve the technical problem of providing a composition useful as a VHF or V/UHF antenna.

In particular, the present invention aims to solve the technical problem of providing a composition useful as a miniaturised VHF or V/UHF antenna.

In particular, the present invention aims at solving the technical problem of providing a nickel-zinc-copper ferrite composition suitable for use as an antenna material, preferably miniaturised, over VHF and/or UHF frequency bands.

In particular, the present invention aims to solve the technical problem of providing a composition useful as an antenna, preferably a miniaturised one, for which resonance occurs above 50 MHz, preferably above 70 MHz, and preferably above 100 MHz, or even more preferably at a higher frequency.

In particular, the present invention aims to solve the technical problem of providing a magneto-dielectric composition preferably having a magnetic permeability μ'≥5 and a dielectric permittivity ε'≥10, with preferably a magnetic permeability close to the dielectric permittivity.

The present invention also aims at solving the technical problem of providing a method for manufacturing such a composition, preferably by a conventional industrial method for preparing ceramic material by grinding/hammering.

DETAILED DESCRIPTION OF THE INVENTION

It has been found by the inventors that the use of a composition according to the present invention, having a high level of cobalt combined with a high level of copper in a nickel-zinc ferrite composition solves at least one, and preferably all, of the above technical problems.

It was discovered by the inventors that using a composition according to the present invention by increasing the Ni/Zn ratio provides a composition advantageous for solving at least one, and preferably all, of the above technical problems.

Advantageously, such a composition can be obtained by introducing cobalt in partial substitution for nickel in a ferrite composition of the alloy of formula $Ni_aZn_bCu_cCo_dFe_{2-\delta}O_4$.

The invention relates to a composition of the formula $Ni_aZn_bCu_cCo_dFe_{2-\delta}O_4$, wherein:
2(a+b+c+d)+3(2−δ)=8
0.05<b<0.5, e.g. 0.1<b<0.5, e.g. 0.1<b<0.4.
0.10<c<0.25, preferably 0.15<c<0.25, alternatively c is 0.20,
0.04<d<0.25, preferably 0.06<d<0.25, and more preferably 0.07<d<0.25, and
δ<0.05.

Advantageously, the composition is a nickel zinc copper ferrite, preferably with a Ni/Zn ratio of 1 to 15.

Advantageously, the composition has a spinel structure.

The invention relates to a nickel-zinc-copper ferrite material with a spinel structure that can be used as an antenna material in VUHF frequency bands.

In one embodiment, "b" is greater than or equal to 0.05.
In one embodiment, "b" is greater than or equal to 0.1.
In one embodiment, "b" is less than or equal to 0.5.
In one embodiment, "b" is less than or equal to 0.4.
In one embodiment, "b" is less than or equal to 0.35.
Advantageously, any of the stated lower bounds may be combined with any of the stated upper bounds.
In one embodiment, 0.05<b<0.5.
In one embodiment, 0.1<b<0.5.
In one embodiment, 0.1<b<0.4.
In one embodiment, 0.15<b<0.35.
In one embodiment, "c" is greater than or equal to 0.10.
In one embodiment, "c" is greater than or equal to 0.15.
In one embodiment, "c" is less than or equal to 0.25.
Advantageously, any of the stated lower bounds may be combined with any of the stated upper bounds.
According to one embodiment, 0.10<c<0.25, preferably 0.15<c<0.25, according to a variant c is 0.20.
In one embodiment, "d" is greater than or equal to 0.04.
In one embodiment, "d" is greater than or equal to 0.05.
In one embodiment, "d" is greater than or equal to 0.06.
In one embodiment, "d" is greater than or equal to 0.07.
In one embodiment, "d" is 0.10.
In one embodiment, "d" is less than or equal to 0.25.
Advantageously, any of the stated lower bounds may be combined with any of the stated upper bounds.
In one embodiment, 0.04<b<0.25.
Preferably 0.06<d<0.25.
Advantageously, 0.07<d<0.25.
Advantageously, 0.09<d<0.25.
In one embodiment, "a" is greater than or equal to 0.3.
In one embodiment, "a" is greater than or equal to 0.35.
In one embodiment, "a" is greater than or equal to 0.4.
In one embodiment, "a" is less than or equal to 0.8.
In one embodiment, "a" is less than or equal to 0.7.
In one embodiment, "a" is less than or equal to 0.6.
Advantageously, any of the stated lower bounds may be combined with any of the stated upper bounds.
In one embodiment, 0.3<a<0.7.
In one embodiment, 0.4<a<0.7.
Advantageously, the composition is selected from the compositions of the following formulas:

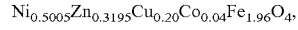

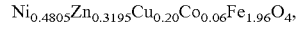

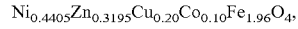

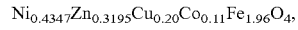

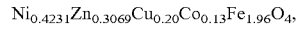

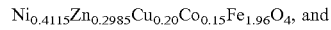 and

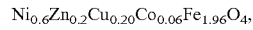

In one embodiment, the Ni/Zn ratio is 1 to 15, preferably 1 to 10, and even more preferably 1.2 to 7.

Advantageously, the Ni/Zn ratio is greater than 2.

In one variant this ratio is 1.38 and in another variant this ratio is 3.

According to an embodiment, the material according to the present invention forms a magneto-dielectric material, preferably having a magnetic permeability μ'>1 and a dielectric permittivity ε'>1, and preferably μ'≥5 and ε'≥10. Measurements of permeability are carried out between 1 MHZ and 1 GHz using a HP4291A impedance analyser.

According to one embodiment, the material according to the present invention has a magnetic permeability μ' of 10 to 20 for the VHF range (1 MHZ to 300 MHZ) or μ' of 5 to 15 for the V/UHF range (200 MHZ to 600 MHz). Measurements of permittivity are carried out between 1 MHz and 1 GHZ using a HP4291A impedance analyser.

According to an embodiment, the material according to the present invention has magnetic losses tan (δμ)<0.06, and preferably dielectric losses tan (de)<0.02 over the frequency band between 100 and 200 MHz. Measurements of magnetic loss are carried out between 1 MHz and 1 GHZ using a HP4291A impedance analyser.

According to one embodiment, tan(6E)<0.006.

The invention further relates to a VHF or V/UHF antenna having a composition or a solid material as defined according to the present invention.

According to an embodiment, the antenna is a VHF or V/UHF antenna of the printed antenna or microstrip or "patch" type comprising one or more layers of a substrate adhered to a radiating element, of which one or more layers of the substrate consists of or comprises a composition according to the invention or a solid material according to the invention.

In one embodiment, the antenna is miniaturised. Typically, the antenna has a larger as dimension of less than 300 mm.

The invention also relates to the use of a composition according to the invention or a solid material according to the invention as a VHF or V/UHF antenna.

Advantageously, the invention concerns an antenna for aeronautics.

In one embodiment, the antenna is adapted for operation between 118 MHz and 156 MHz, and preferably between 118 and 137 MHz.

The invention further relates to a method for manufacturing a composition as defined according to the present invention.

In particular, the invention relates to a method for manufacturing a composition according to the invention or a solid material according to the invention, said method comprising:

grinding the raw materials providing Ni, Zn, Cu, Co, Fe and O, typically NiO; ZnO; CuO; $Co_3O_4$ and $Fe_2O_3$, after grinding, the powder is dried and then sieved, preferably with a 400 μm sieve, after sieving, the powder is heat-treated, preferably at a temperature of at least 600° C., and for example 800° C., for example for 1 to 10 hours, typically 2 hours, after heat treatment, the powder undergoes a second grinding, for example with an aqueous solution, then the powder is shaped into a solid material.

In one embodiment, prior to shaping, the method comprises coating the powder with a binder to provide a shaped material.

In one embodiment, after shaping, the method comprises sintering the shaped material.

Advantageously, the material is synthesised according to a method for preparing a ceramic material.

In one embodiment, the step of grinding the raw materials comprises or consists of the weighing of the different oxides to make the composition: NiO; ZnO; CuO; $Co_3O_4$ and $Fe_2O_3$. To take into account the iron impurities introduced during the grinding process, an iron oxide defect is introduced at this weighing. According to an embodiment, the raw materials are then mixed and then ground in an aqueous process (typically for 20 hours for jar grinding) with grinding equipment, such as a ball mill, an attrition mill, a jar turner, etc.

In one embodiment, after grinding, the powder is dried and then sieved to 400 μm. It is then heat-treated ("calcinated") in a kiln at 800° C. for 2 hours.

In one embodiment, the powder is subjected to a second grinding. For example, the powder is sieved and then put into an aqueous slurry, i.e. diluted in an aqueous solution, typically water, for regrinding (typically lasting 36 hours for jar grinding).

In one embodiment, the powder is coated with a binder and then shaped by pressing.

Advantageously, the powder receives a coating in order to allow the shaping of the powder. The addition of binder can be done during the second grinding by adding it to the slip or after grinding once the powder is dry and sieved. In each case, the powder is preferably dried and then sieved between 200 and 400 μm before shaping.

Advantageously, the shaping is carried out by pressing (typically uni-axial) in the form of plates, discs or cores according to the need.

Advantageously, the shaped material is sintered.

Sintering typically takes place at a temperature above 800° C., and preferably between 850 and 1000° C.

Typically, sintering is carried out in an oxidising atmosphere, for example air.

In one embodiment, the pressed material is sintered at 950° C. for 2 hours in air. Preferably, before the kiln temperature is raised to, for example, 950° C., the materials are debonded with a slow temperature rise below 500° C. The duration of the debonding depends on the dimensions of the parts and their mass and can range, for example, from 1 h to 48 h. Sintering according to the invention at a temperature below 1200° C. and advantageously at 950° C. has a significant technical advantage. In general, ferrites with a spinel structure sinter between 1200 and 1400° C. for 4 to 12 hours. The invention thus saves time and cost on the kiln (sized for temperatures <1000° C.) and on the power required for heating.

Advantageously, the composition or material according to the present invention constitutes a magneto-dielectric material having a magnetic permeability close (for example +/−10 units, preferably +/−5 units) to its dielectric permittivity (magneto-dielectric materials: $\varepsilon'>1$ and $\mu'>1$).

Advantageously, the composition or material according to the present invention exhibits a ferromagnetic resonance above 50 MHz, preferably above 70 MHz, and most preferably above 100 MHz.

Ferromagnetic resonance above a certain value means that the magnetic permeability peak occurs at a frequency above this value.

Advantageously, the composition or material according to the present invention exhibits a ferromagnetic resonance above 120 MHz, preferably above 140 MHz, and most as preferably above 150 MHz.

Even more advantageously, the composition or material according to the present invention has a ferromagnetic resonance above 200 MHz.

Such an advantage is linked in particular to the composition of the alloy formula according to the invention.

Advantageously, the composition and material according to the invention have a magnetic permeability $\mu'$ greater than 10, preferably greater than 15, and even more preferably greater than 20, for the VHF range (1 MHz to 300 MHz).

Advantageously, the composition and material according to the invention have a magnetic permeability $\mu'$ greater than 5, preferably greater than 10, and even more preferably greater than 15, for the V/UHF range (200 MHz to 600 MHz).

Advantageously, the composition and material according to the invention have low magnetic losses at VHF/UHF with tan $\delta_\mu$ less than 0.05 over the frequency band from 1 to 50 MHz, preferably from 1 to 70 MHz, and more preferably from 1 to 100 MHz.

Advantageously, according to one embodiment, the composition and material according to the invention have low magnetic losses at VHF/UHF with tan $\delta_\mu$ less than 0.06, and preferably less than 0.05, and even more preferably less than 0.04, over the frequency band from 100 to 200 MHz.

Advantageously, the composition and material according to the invention have a moderate magnetic permeability (typically $\mu'$ from 5 to 20, preferably from 10 to 20) and low magnetic losses in VHF/UHF (tan $\delta_\mu$<0.05) over the frequency band from 100 to 200 MHz.

EXAMPLES

To evaluate the potential of the materials according to the invention, we are mainly interested in the change in the permeability and the magnetic losses as a function of frequency. This means looking at the moment when the losses increase (which coincides with the onset of ferromagnetic resonance) and the value of the permeability before resonance.

Measurements of permeability, permittivity, magnetic and dielectric losses are carried out between 1 MHz and 1 GHz using a HP4291A impedance analyser.

For the measurement of permeability and magnetic losses, samples in the form of a cylindrical as-sintered torus type APC7 are manufactured ($\varnothing_{ext}$≤7 mm; $\varnothing_{int}$≥3.05 mm; thickness ≤3 mm). Measurements are made in the *Keysight 16454A Magnetic Material Test Fixture*. The references for this measure can be found on the manufacturer's website (reference document: 16454*A Magnetic Material Test Fixture Operation and Service Manual and Materials Measurement: Magnetic Materials—Application Brief* at https://www.keysight.com/en/pd-1000000509%3Aepsg_%3Apro-pn-16454A/magnetic-material-test-fixture?µm-PL&nid=-536902475.536879639&cc-FR&lc-fre).

For the measurement of permittivity and dielectric loss, samples in the form of a 10 mm square plate of varying thickness (1; 0.5; 0.3 mm) are manufactured. Capacitance and loss factor are then measured in the impedance analyser (HP4291A) using the *HP Agilent Keysight 160924 Spring Clip Test Fixture* allowing for measurement between 1 and 500 MHz.

Figure 1:
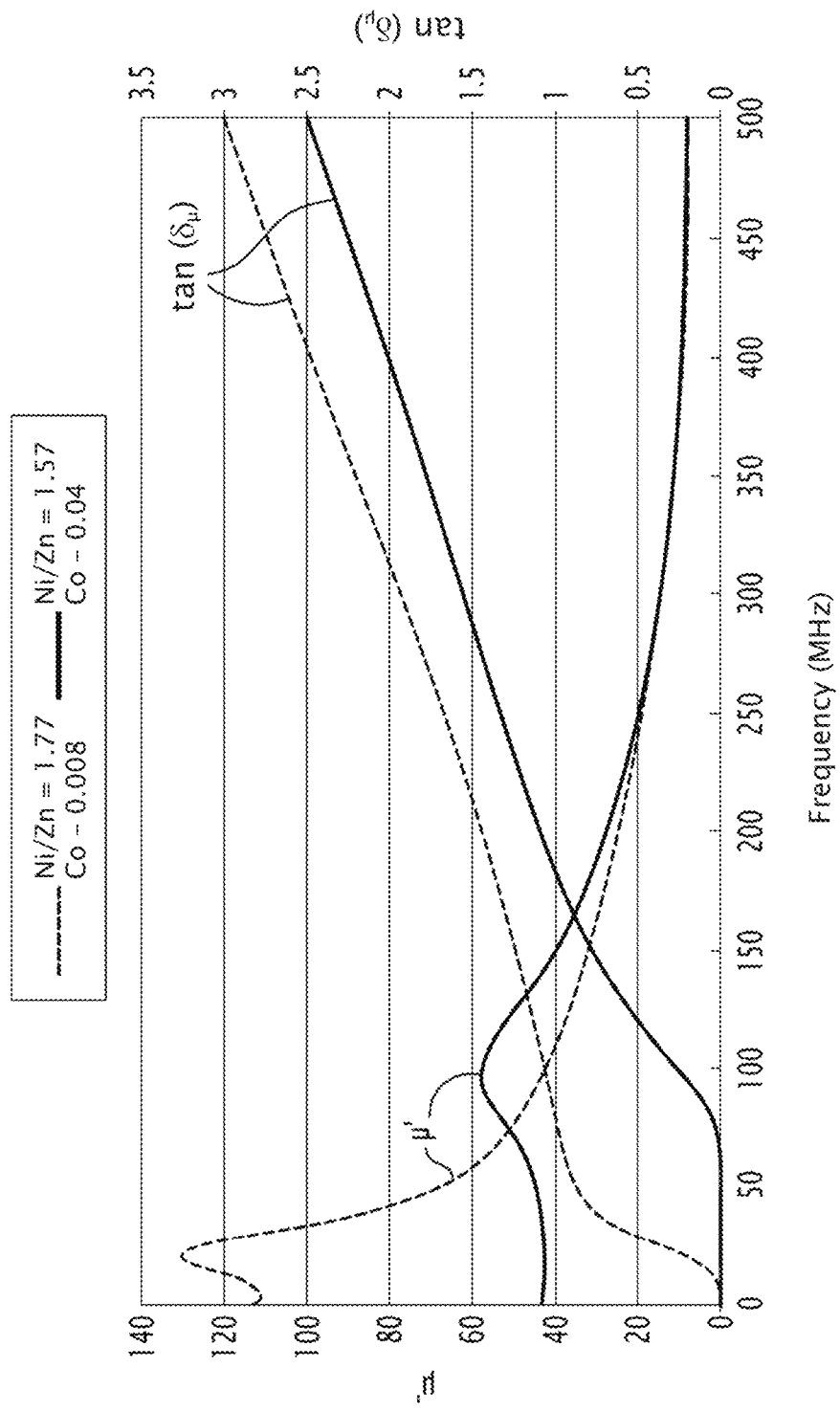
FIG. 1 is a graph showing the magnetic permeability and magnetic losses of a conventional nickel zinc ferrite (NZ50 where Ni/Zn is 1.77 and Co is 0.008) and a nickel zinc copper ferrite ($Ni_{0.5005}Zn_{0.3195}Cu_{0.20}Co_{0.04}Fe_{1.96}O_4$ where Ni/Zn is 1.57 and Co is 0.04) against frequency.

FIG. 1 shows such curves. The dotted line shows a classic spinel ferrite (NZ50, marketed by EXXELIA) and the appearance of the resonance can be observed before 50 MHz (permeability peak at about 20 MHz). The losses increase and make the material unusable as VHF and/or UHF antenna material. The use of a nickel-zinc-copper ferrite with a copper content of 0.2 as shown in FIG. 1 ($Ni_{0.5005}Zn_{0.3195}Cu_{0.20}Co_{0.04}Fe_{1.96}O_4$) allows the resonance to be shifted to higher frequencies, above 50 MHz (peak at about 100 MHz).

Figure 2:
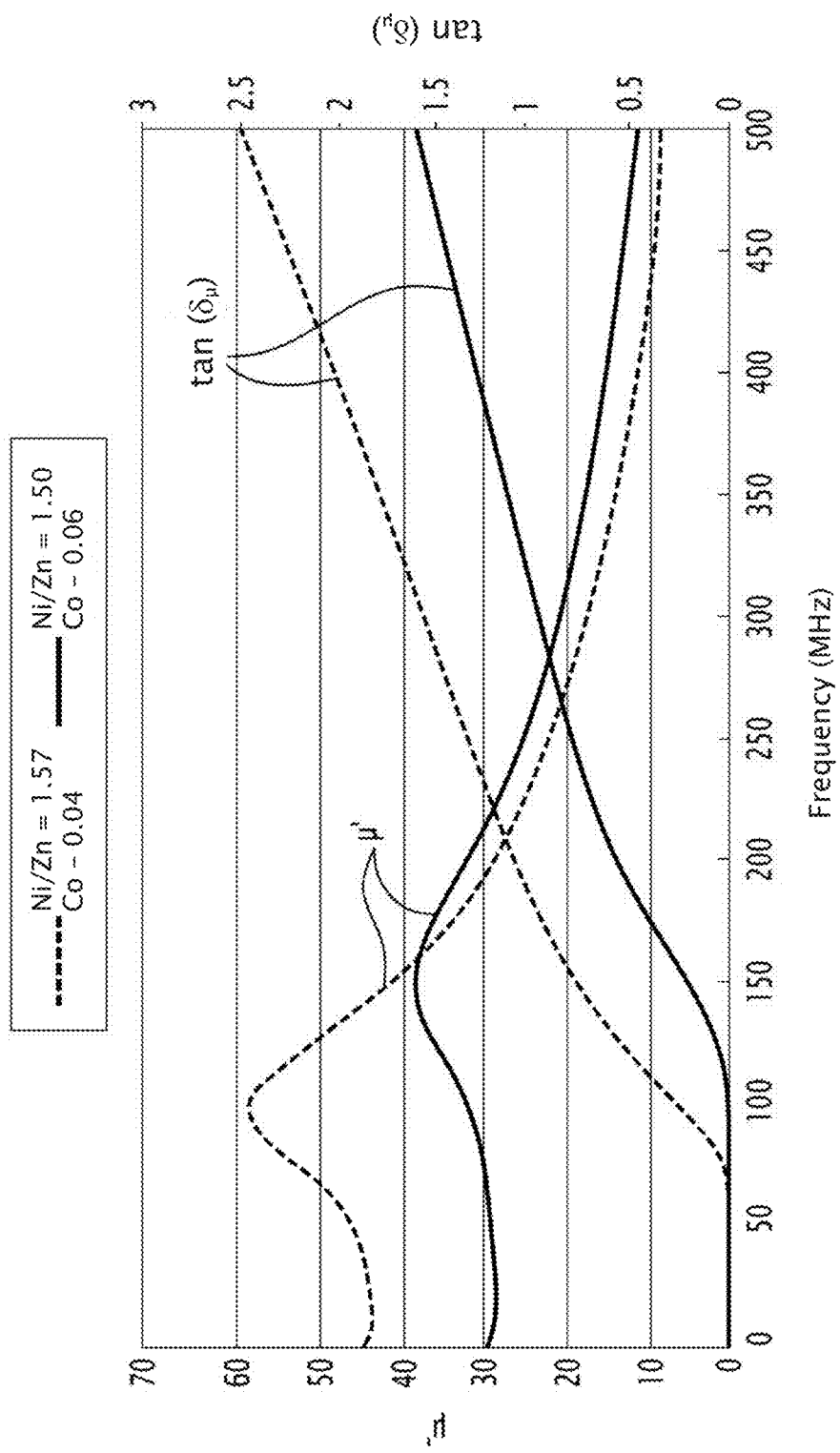
FIG. 2 is a graph showing the magnetic permeability and magnetic losses of NZC ferrites against frequency. $Ni_{0.5005}Zn_{0.3195}Cu_{0.20}Co_{0.04}Fe_{1.96}O_4$ (Ni/Zn is 1.57 and Co is 0.04) and $Ni_{0.4805}Zn_{0.3195}Cu_{0.20}Co_{0.04}Fe_{1.96}O_4$ (Ni/Zn is 1.50 and Co is 0.06).

FIG. 2 shows the composition $Ni_{0.4805}Zn_{0.3195}Cu_{0.20}Co_{0.06}Fe_{1.96}O_4$. With a Ni/Zn ratio of 1.5 and an increased cobalt content of 0.06, the resonance is pushed to a higher frequency, allowing low losses (tan $\delta_\mu$<0.04) up to 100 MHz. This gives a material that can be used as an antenna material between 1 and 100 MHz with a $\mu'$ around 29.

Figure 3:
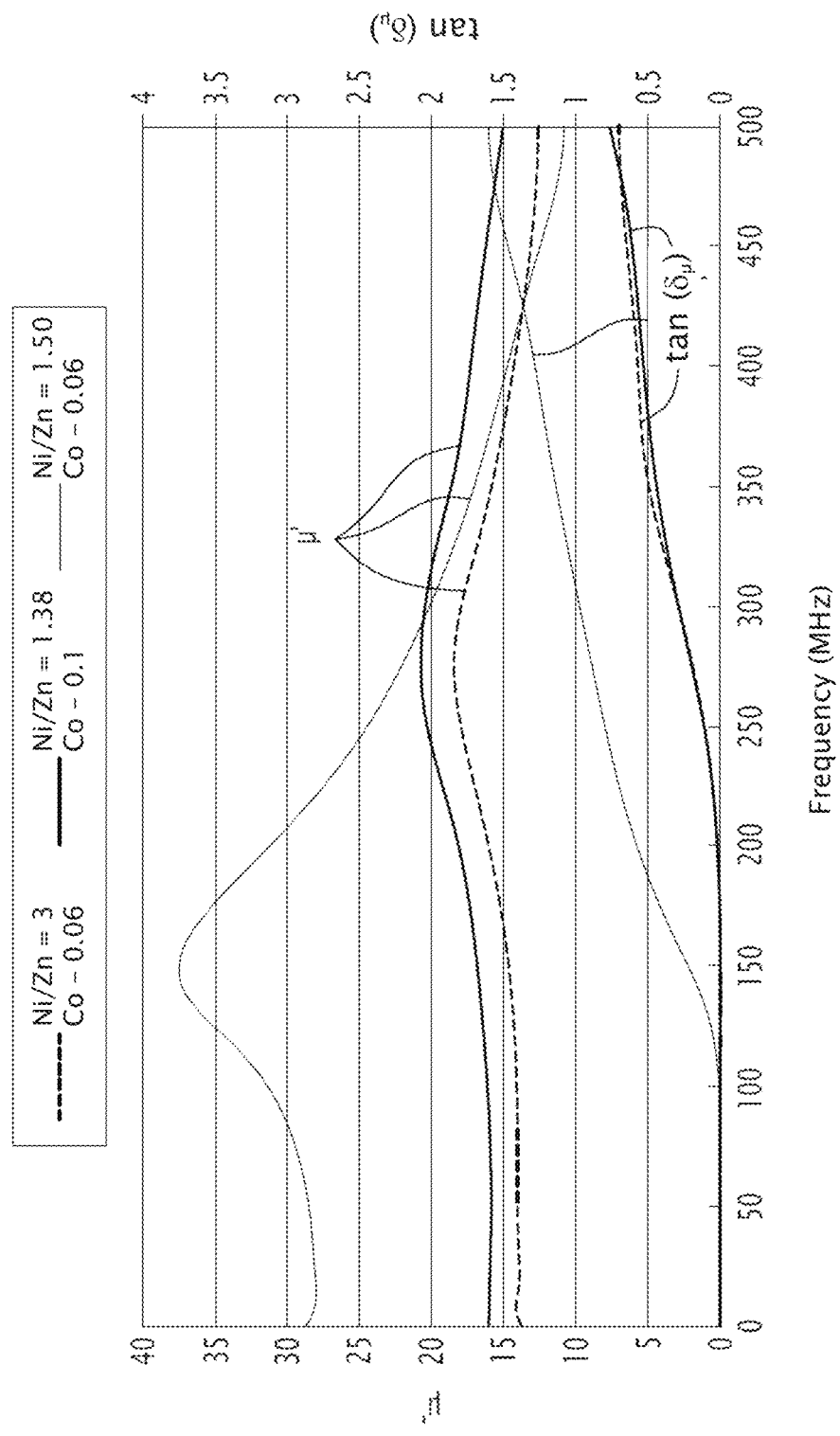
FIG. 3 is a graph showing the magnetic permeability and magnetic losses of NZC ferrites as a function of frequency, where $Ni_{0.4805}Zn_{0.3195}Cu_{0.20}Co_{0.04}Fe_{1.96}O_4$ (Ni/Zn is 1.50 and Co is 0.06); $Ni_{0.4405}Zn_{0.3195}Cu_{0.20}Co_{0.10}Fe_{1.96}O_4$ (Ni/Zn is 1.38 and Co is 0.1) and $Ni_{0.6}Zn_{0.2}Cu_{0.20}Co_{0.06}Fe_{1.96}O_4$ (Ni/Zn is 3 and Co is 0.06).

FIG. 3 compares two new materials to the one already shown in thin solid line/grey in FIG. 2 ($Ni_{0.4805}Zn_{0.3195}Cu_{0.20}Co_{0.06}Fe_{1.96}O_4$). The first material shown in thick solid line/black has the following composition: $Ni_{0.4405}Zn_{0.3195}Cu_{0.20}Co_{0.10}Fe_{1.96}O_4$. In comparison, the Ni/Zn ratio was slightly decreased (due to the fact that the strong addition of cobalt was done by substitution of nickel) but the proportion of cobalt was strongly increased to 0.1 mol. This shows the direct effect of the cobalt in pushing back the resonance after 200 MHz. The similar effect is observed on the material shown as a dotted line in FIG. 3: $Ni_{0.6}Zn_{0.2}Cu_{0.20}Co_{0.06}Fe_{1.96}O_4$. Compared to the material shown in thin/grey solid line, the cobalt content remained the same but the Ni/Zn ratio was doubled. It can be seen that the resonance is also pushed back after 200 MHz.

Figure 4:
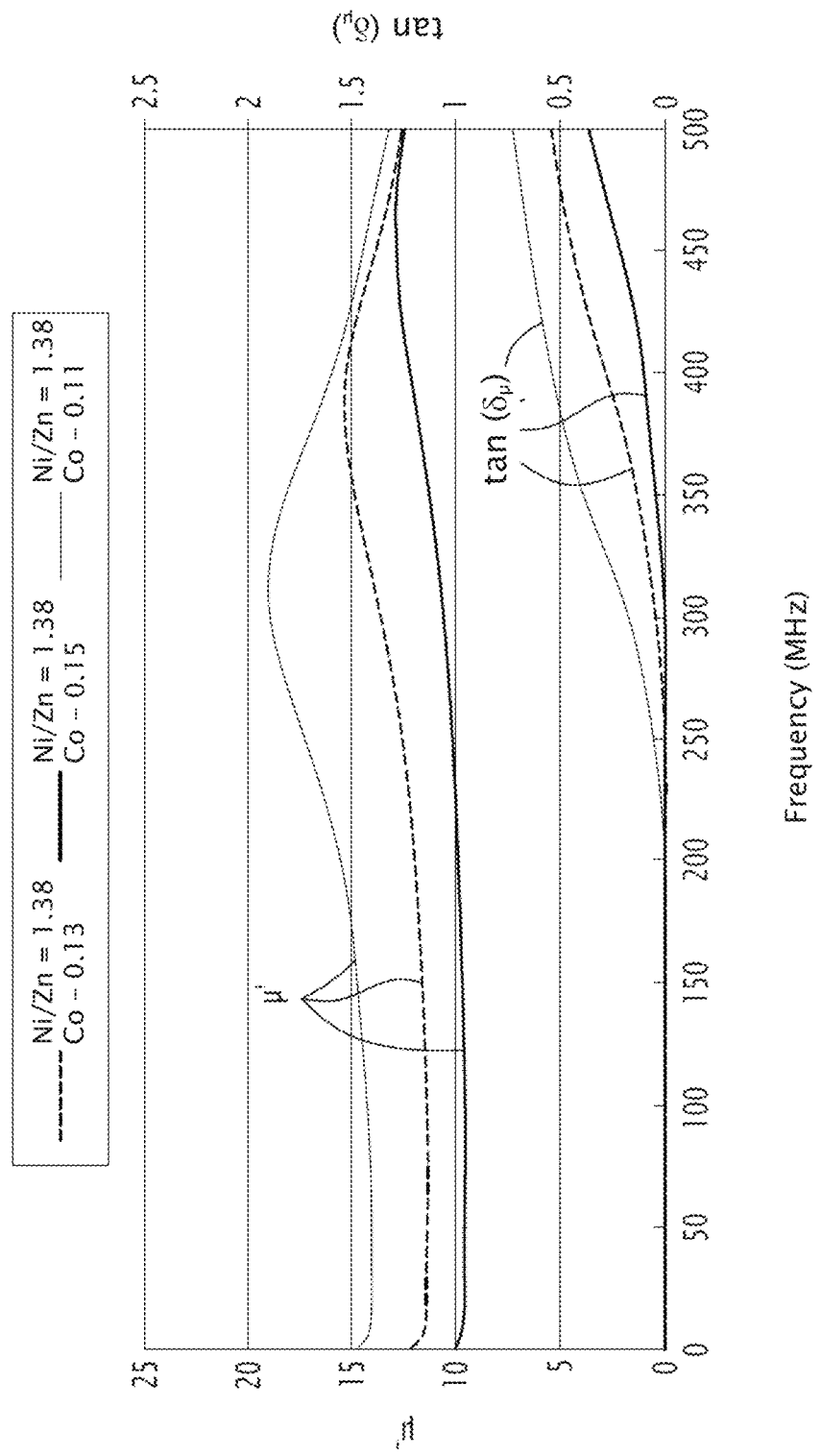
FIG. 4 is a graph showing the magnetic permeability and magnetic losses of NZC ferrites as a function of frequency, where $Ni_{0.4347}Zn_{0.3153}Cu_{0.20}Co_{0.11}Fe_{1.96}O_4$ (Ni/Zn is 1.38 and Co is 0.11); $Ni_{0.4231}Zn_{0.3069}Cu_{0.20}Co_{0.13}Fe_{1.96}O_4$ (Ni/Zn is 1.38 and Co is 0.13) and $Ni_{0.4115}Zn_{0.2985}Cu_{0.20}Co_{0.15}Fe_{1.96}O_4$ (Ni/Zn is 1.38 and Co is 0.15).

FIG. 4 shows three compositions ($Ni_{0.4347}Zn_{0.3153}Cu_{0.20}Co_{0.11}Fe_{1.96}O_4$; $Ni_{0.4231}Zn_{0.3069}Cu_{0.20}Co_{0.13}Fe_{1.96}O_4$; and $Ni_{0.4115}Zn_{0.2985}Cu_{0.20}Co_{0.15}Fe_{1.96}O_4$), each with a Ni/Zn ratio set at 1.38. The cobalt content of these compositions is set at 0.11, 0.13 and 0.15 respectively. The effect of the cobalt can be clearly seen, allowing the material to be used at higher frequencies (above 300 MHz for the composition with a cobalt content of 0.15).

Figure 5:
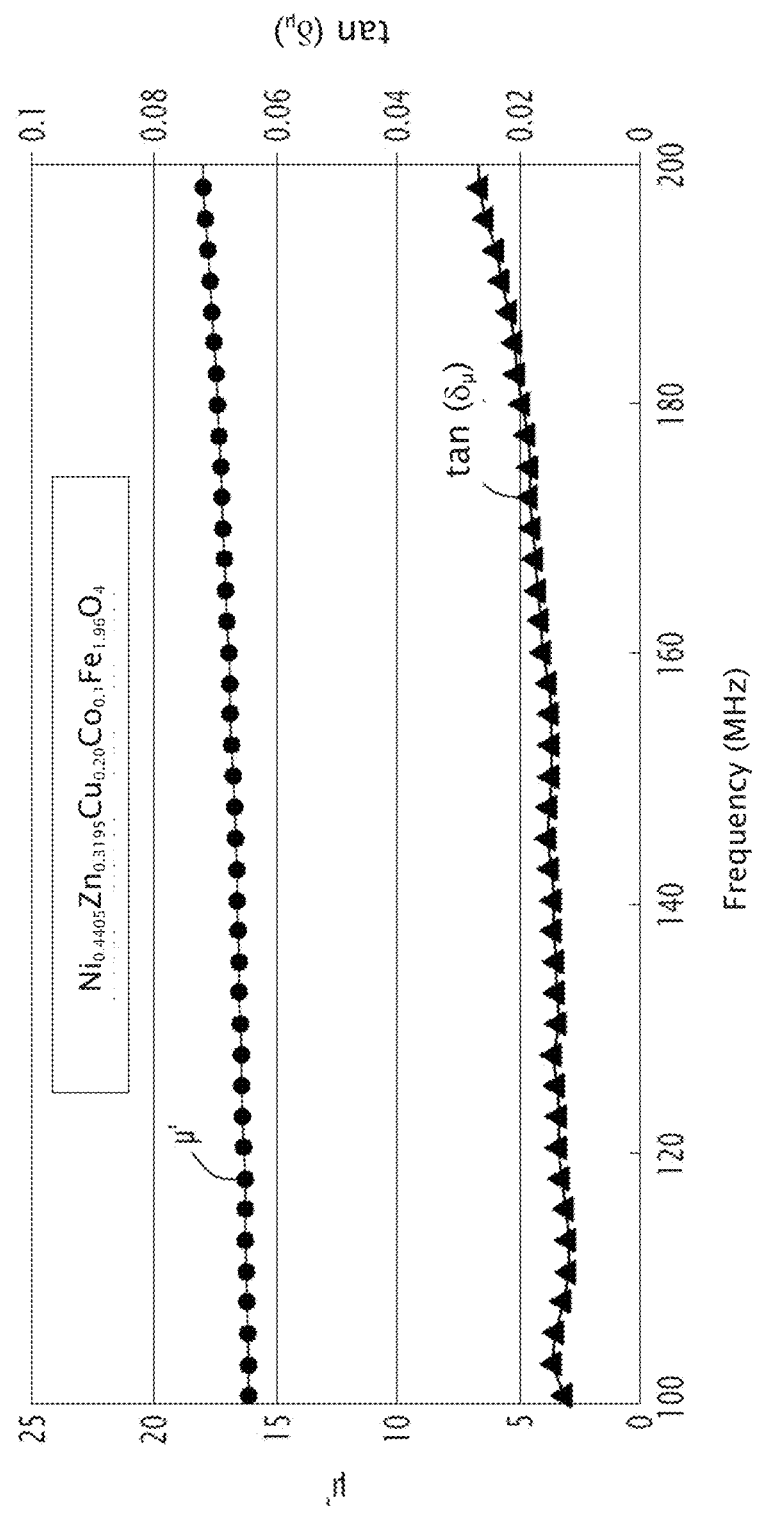
FIG. 5 is a graph showing the magnetic permeability and magnetic losses of the material $Ni_{0.4405}Zn_{0.3195}Cu_{0.20}Co_{0.10}Fe_{1.96}O_4$ as a function of frequency.
Figure 6:
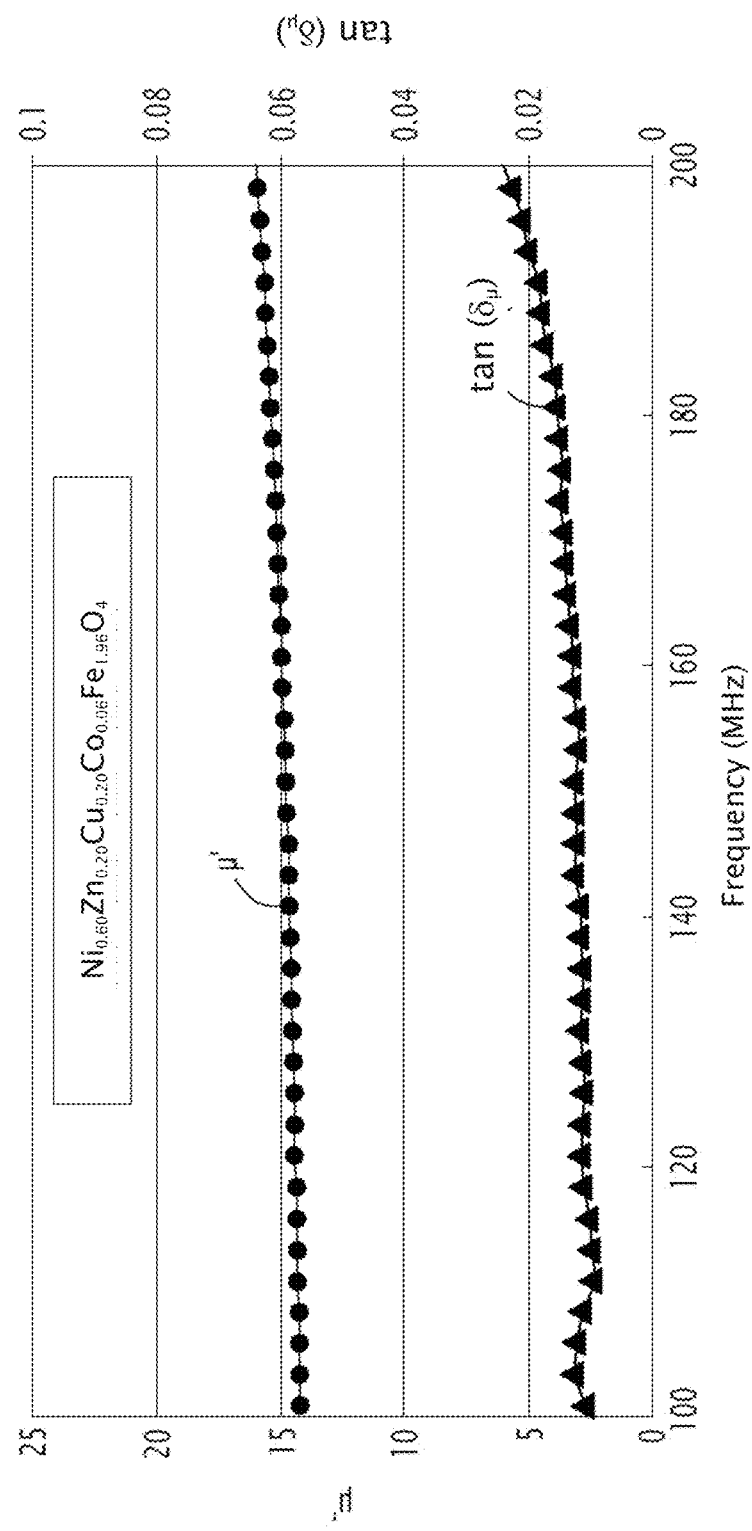
FIG. 6 is a graph showing the magnetic permeability and magnetic losses of the material $Ni_{0.6}Zn_{0.2}Cu_{0.20}Co_{0.06}Fe_{1.96}O_4$ as a function of frequency.

FIGS. 5 and 6 focus on the frequency range between 100 and 200 MHz. This frequency band is of great interest because of the many VHF applications operating in this range and in particular for aeronautical applications (band of use between 118 and 156 MHz and more particularly between 118 and 137 MHz for aeronautical traffic). Over these particular frequency bands it is observed in FIGS. 4 and 5 that the materials $Ni_{0.4405}Zn_{0.3195}Cu_{0.20}Co_{0.10}Fe_{1.96}O_4$ et $Ni_{0.6}Zn_{0.2}Cu_{0.20}Co_{0.06}Fe_{1.96}O_4$ show advantageous performance with magnetic losses $tan(\delta_\mu)<0.02$ and a magnetic permeability $\mu'$ 15

Figure 7:
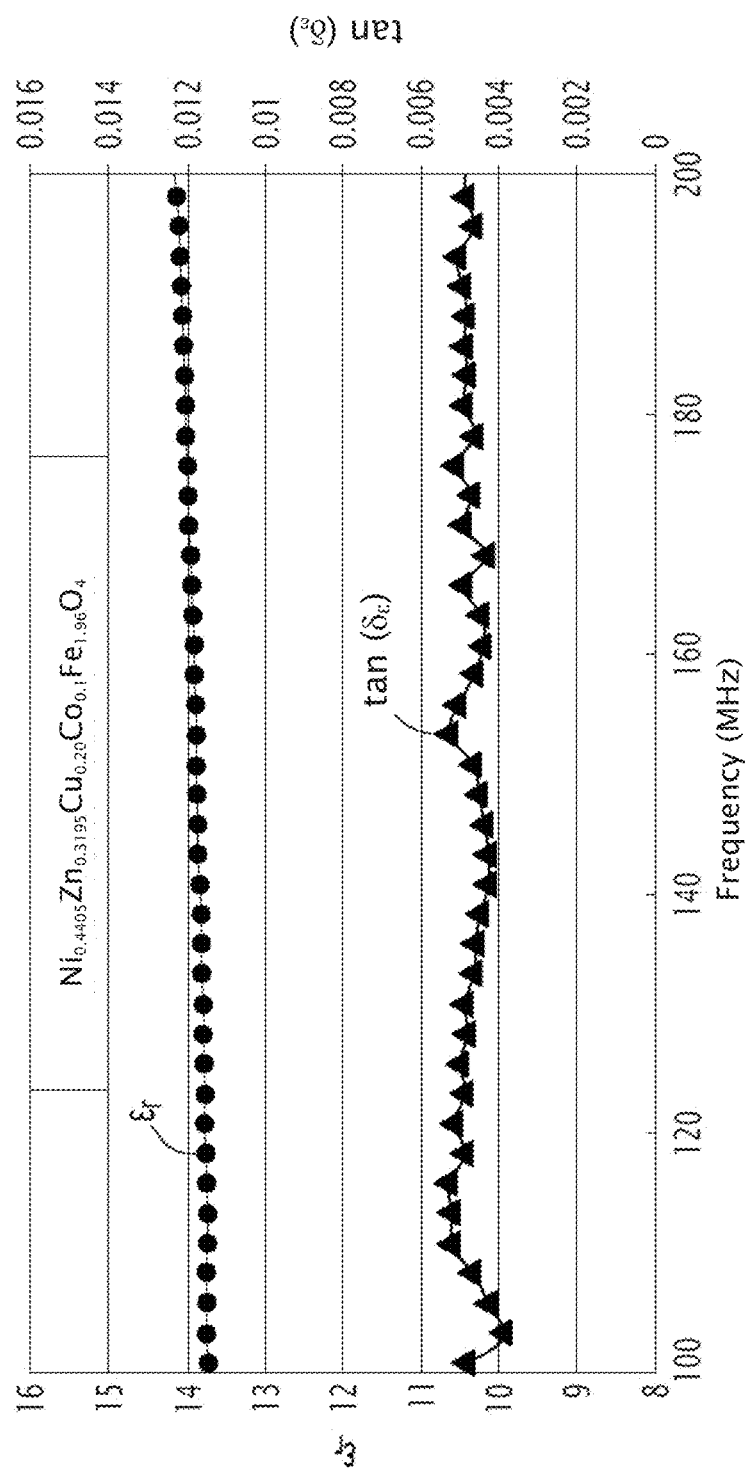
FIG. 7 is a graph showing the permittivity and dielectric losses of the material $Ni_{0.4405}Zn_{0.3195}Cu_{0.20}Co_{0.10}Fe_{1.96}O_4$ as a function of frequency.
Figure 8:
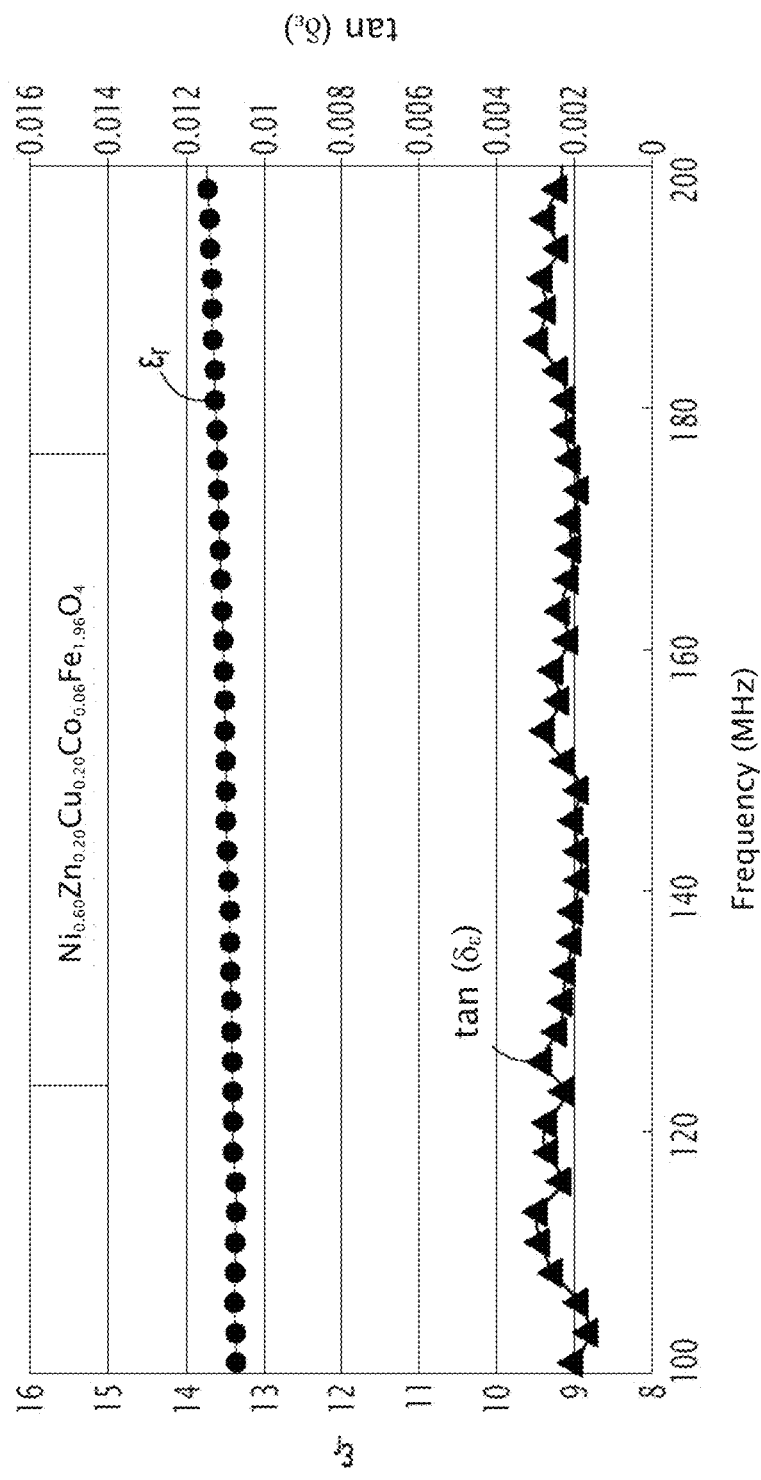
FIG. 8 is a graph showing the permittivity and dielectric losses of the material $Ni_{0.6}Zn_{0.2}Cu_{0.20}Co_{0.06}Fe_{1.96}O_4$ as a function of frequency.

FIGS. 7 and 8 show the relative permittivity and dielectric losses of the materials $Ni_{0.4405}Zn_{0.3195}Cu_{0.20}Co_{0.10}Fe_{1.96}O_4$ and $Ni_{0.6}Zn_{0.2}Cu_{0.20}Co_{0.06}Fe_{1.96}SO_4$ over the frequency range 100-200 MHz. They show advantageous performance with dielectric losses $tan(\delta_\varepsilon)<0.006$ and a dielectric constant $\varepsilon'\approx13$-14.

These results support the scope of the invention in its generality. In particular, the examples support that the Ni/Zn ratio and the cobalt content defined according to the invention make it possible to adapt the targeted behaviour. Starting with one of the compositions of the examples according to the invention and varying one parameter in one direction and the other in the opposite direction, this achieves a similar result in terms of magnetic permeability $\mu'$, dielectric permittivity $\varepsilon'$ and magneto-dielectric losses $tan(\delta_\mu)+tan(\delta_\varepsilon)$. Thus, there are a large number of possible compositional variants with similar performance to that shown in the examples.

What is claimed is:

1. A composition chosen from compositions of the following formulas:

$Ni_{0.4805}Zn_{0.3195}Cu_{0.20}Co_{0.06}Fe_{1.96}O_4$, $Ni_{0.4405}Zn_{0.3195}Cu_{0.20}Co_{0.10}Fe_{1.96}O_4$, $Ni_{0.4347}Zn_{0.3153}Cu_{0.20}Co_{0.11}Fe_{1.96}O_4$, $Ni_{0.4231}Zn_{0.3069}Cu_{0.20}Co_{0.13}Fe_{1.96}O_4$, $Ni_{0.4115}Zn_{0.2985}Cu_{0.20}Co_{0.15}Fe_{1.96}O_4$; and $Ni_{0.6}Zn_{0.2}Cu_{0.20}Co_{0.06}Fe_{1.96}O_4$.

2. The composition of claim 1, forming a magneto-dielectric material.

3. The composition of claim 1, wherein it has a magnetic permeability $\mu'$ of 10 to 20 for the VHF range (1 MHz to 300 MHZ) or $\mu'$ of 5 to 15 for the V/UHF range (200 MHZ to 600 MHZ).

4. The composition according to claim 1, wherein it has magnetic losses $tan(\delta_\mu)<0.06$ over the frequency band between 100 and 200 MHZ, measured between 1 MHz and 1 GHZ.

5. The composition of claim 1, having a magnetic permeability $\mu'>1$ and a dielectric permittivity $\varepsilon'>1$ over the frequency band between 100 and 200 MHZ, measured between 1 MHz and 1 GHZ.

6. The composition of claim 1, wherein $\mu'\geq5$ and $\varepsilon'\geq10$ over the frequency band between 100 and 200 MHZ, measured between 1 MHz and 1 GHz.

7. The composition according to claim 1, wherein the dielectric losses $tan(\delta\sqrt{})$ is <0.02 over the frequency band between 100 and 200 MHz, measured between 1 MHz and 1 GHZ.

8. A VHF or V/UHF antenna wherein it comprises a composition of the formula $Ni_aZn_bCu_cCo_dFe_{2-\delta}O_4$, wherein:

2(a+b+c+d)+3(2−δ)=8

0.05<b<0.5, 0.10<c<0.25, 0.04<d<0.25, and

δ<0.05.

9. The VHF or V/UHF antenna according to claim 8, wherein it has a larger dimension of less than 300 mm.

10. A VHF or V/UHF antenna of the printed or microstrip type, wherein it comprises one or more layers of a substrate bonded to a radiating element, of which one or more layers of the substrate comprises a composition of the formula $Ni_aZn_bCu_cCo_dFe_{2-\delta}O_4$, wherein:

2(a+b+c+d)+3(2−δ)=8

0.05<b<0.5, 0.10<c<0.25, 0.04<d<0.25, and

δ<0.05.

11. A method for manufacturing a composition according to claim 1, characterised in that wherein said method comprises:

grinding raw materials providing Ni, Zn, Cu, Co, Fe and O to obtain a powder, after grinding, the powder is dried and then sieved, after sieving, the powder is heat-treated at a temperature of at least 600° C. for 1 to 10 hours, after heat treatment, the powder undergoes a second grinding, and then the powder is shaped into a solid material.

12. The method according to claim 11, wherein prior to shaping, the method comprises coating the powder with a binder.

13. The method according to claim 11, wherein after shaping, the method comprises sintering the solid material.

14. The method according to claim 11, wherein the raw materials providing Ni, Zn, Cu, Co, Fe and O are NiO; ZnO; CuO; $Co_3O_4$ and $Fe_2O_3$.

* * * * *